United States Patent
Ogiso et al.

(10) Patent No.: US 11,126,058 B1
(45) Date of Patent: Sep. 21, 2021

(54) SEMICONDUCTOR OPTICAL MODULATION ELEMENT

(71) Applicant: NIPPON TELEGRAPH AND TELEPHONE CORPORATION, Tokyo (JP)

(72) Inventors: Yoshihiro Ogiso, Atsugi (JP); Hiroyasu Mawatari, Isehara (JP); Nobuhiro Kikuchi, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 434 days.

(21) Appl. No.: 16/332,740

(22) PCT Filed: Sep. 13, 2017

(86) PCT No.: PCT/JP2017/033014
§ 371 (c)(1),
(2) Date: Mar. 12, 2019

(87) PCT Pub. No.: WO2018/052013
PCT Pub. Date: Mar. 22, 2018

(30) Foreign Application Priority Data

Sep. 13, 2016 (JP) .............................. JP2016-178905

(51) Int. Cl.
*G02F 1/21* (2006.01)
*G02F 1/017* (2006.01)

(52) U.S. Cl.
CPC .......... *G02F 1/212* (2021.01); *G02F 1/01708* (2013.01)

(58) Field of Classification Search
CPC .............................. G02F 1/212; G02F 1/01708
See application file for complete search history.

(56) References Cited

U.S. PATENT DOCUMENTS

| 5,914,501 A | 6/1999 | Antle et al. |
| 2005/0018730 A1 | 1/2005 | Taylor et al. |

(Continued)

FOREIGN PATENT DOCUMENTS

| JP | S59-19389 A | 1/1984 |
| JP | 2005-99387 A | 4/2005 |

(Continued)

OTHER PUBLICATIONS

International Preliminary Report on Patentability dated Mar. 28, 2019, issued in PCT Application No. PCT/JP2017/033014. Filed Sep. 13, 2017.

(Continued)

*Primary Examiner* — Sung H Pak
(74) *Attorney, Agent, or Firm* — Workman Nydegger

(57) ABSTRACT

The present invention provides a highly reliable, high-speed, and low-loss semiconductor optical modulation element that protects a pin junction structure in a modulation region against reverse voltage ESD by configuring an additional capacity having a thyristor structure between a plurality of feeding pad electrodes. An n-type contact layer, an n-type cladding layer, a non-doped core/cladding layer, a p-type cladding layer, and a p-type contact layer are sequentially laminated on the substrate surface. A Mach-Zehnder interferometric waveguide and a plurality of feeding pad installation sections are formed by dry etching. The n-type contact layer and the n-type cladding layer are removed except for a modulation region of the Mach-Zehnder interferometric waveguide and a feeding region in which the feeding pad installation sections are formed so that the modulation region and the semiconductor of the lower part of the feeding region are electrically isolated from each other. The feeding pads are formed on the common n-type contact layer (Continued)

and n-type cladding layer. A thyristor structure of a pinip junction is formed between the feeding pads.

18 Claims, 17 Drawing Sheets

(56) References Cited

U.S. PATENT DOCUMENTS

2007/0096077 A1* 5/2007 Sanga .................. H01L 29/205
257/13
2007/0258500 A1 11/2007 Albrecht et al.

FOREIGN PATENT DOCUMENTS

| | | | |
|---|---|---|---|
| JP | 2005-217381 | A | 8/2005 |
| JP | 2007-512689 | A | 5/2007 |
| JP | 2010-287604 | A | 12/2010 |
| JP | 2011-197343 | A | 10/2011 |
| JP | 2013246223 | A | 12/2012 |
| JP | 2013246223 | A | 12/2013 |
| TW | 418548 | A | 1/2001 |

OTHER PUBLICATIONS

K. -O. Velthaus et al., *Impedance-Engineered Low Power MZM / Driver Assembly for CFP4-Size Puggable Long Haul and Metro Transceiver*, ECOC 2014, Tu.1.1.1, pp. 3.

Notice of Allowance dated Sep. 6, 2019, issued in Japanese Application No. 2018-539743.

Notice of Allowance dated Jun. 13, 2018, issued in Taiwanese Application No. 10720531630.

* cited by examiner

SEMICONDUCTOR OPTICAL MODULATION ELEMENT

TECHNICAL FIELD

The present invention relates to a semiconductor optical modulation element with a surge bypass circuit capable of high speed modulation.

BACKGROUND ART

In recent years, research and development of optical modulators using compound semiconductor materials are actively conducted with downsizing and speed enhancement of optical modulators as a backdrop. Among them, an optical modulator using InP as a substrate material can perform highly efficient modulation operation by using, for example, the quantum-confined Stark effect in a communication wavelength band. Attention is therefore being given to InP as a potential alternative modulator material to a conventional ferroelectric material.

As a semiconductor optical modulator, an InP/InGaAsP optical modulator using a pin heterojunction to effectively apply voltage to a core of a waveguide together with optical confinement and an npin-type semiconductor optical modulator structure in which both InP cladding layers are of n-type for realization of a lower voltage drive optical modulator and a thin p-type semiconductor layer (p-type barrier layer) is inserted as a barrier layer for suppressing electron current are proposed (e.g., PTL 1).

Since this npin type does not use a p-type cladding layer that is a factor causing optical loss, it enables the use of a relatively long waveguide and has the advantage in decreasing drive voltage. In addition, since the npin type has such a degree of freedom that the thickness of a depletion layer can be designed arbitrarily and optimally, it has the characteristics of easily satisfying matching of electrical impedancedance and matching of the speed of electricity and the speed of light at the same time and therefore being advantageous in speed enhancement.

On the other hand, for reliability of semiconductor devices, it is impossible to neglect measures against electrostatic discharge (ESD). In a discussion about ESD in a diode device like a semiconductor, ESD should be divided into two polarities: so-called "forward voltage ESD" in which current flows by voltage application between pn junctions; and so-called "reverse voltage ESD" in which current does not flow (depletion).

Since current generally flows through a diode in the case of forward voltage ESD, a failure rate is low there. In contrast, since current does not flow through a diode in reverse voltage ESD, a high electrical field is directly and momentarily applied to a depletion layer, which results in a rise in the failure rate. Therefore, in an ESD test for a normal device, ESD evaluation is often performed by using the polarity of reverse voltage.

FIG. 14 shows a top view of a conventional semiconductor optical modulator having an npin structure, FIG. 15 shows a section XV-XV of FIG. 14, FIG. 16 shows a section XVI-XVI of FIG. 14, and FIG. 17 shows a section XVII-XVII of FIG. 14. A conventional semiconductor optical modulator has an n-type contact layer 302, an n-type cladding layer 303, a p-type carrier blocking layer 304, and a non-doped core/cladding layer 305 that are sequentially laminated on an SI-InP substrate 301. As shown in FIG. 15, the non-doped core/cladding layer 305 is formed in such a manner as to configure a Mach-Zehnder interferometric waveguide. On the non-doped core/cladding layer 305, there are a region in which a semi-insulating (SI) cladding layer 306 is formed as shown in FIG. 15 and a region in which an n-type cladding layer 309 and an n-type contact layer 310 are formed as shown in FIG. 16. The periphery of the waveguide is covered with an organic film 308 such as benzocyclobutene (BCB).

An electrode 307 is formed on the organic film 308 and connected to a lower n-type contact layer 302 and an upper n-type contact layer 310 exposed by partially etching the organic film 308.

In such a conventional semiconductor optical modulator, since a capacity of a pn junction of a modulation region is predominant in a stray capacity of a device, a high electrical field by ESD is mostly applied to the pn junction. This results in an increase in the probability of causing a diode failure in the modulation region to be the core of the device.

In particular, differently from a conventional pin structure (e.g., NPL 1), an npin structure especially has a problem in electrical surge resistance because, for example, (1) intermediate p layer potential is not fixed, (2) a charge tends to build up at an np junction, and (3) a breakdown tends to occur in a thin film p layer due to, for example, the tunnel effect.

In general, for improvement of the anti-surge characteristics of a semiconductor device, a block capacitor is provided near the device and electrically connected in parallel to the device, thereby increasing a stray capacity and improving the surge resistance.

However, if a surge is applied to the semiconductor device before the block capacitor is mounted/provided, the probability of causing a surge failure increases. For this reason, it is preferable that an additional capacity be not added at the mounting step but be built at the stage of a semiconductor wafer process.

A method of adding a capacity to the semiconductor side mainly has two patterns: one is a method of providing a metal-insulator-metal (MIM) structure by sandwiching an insulating film between metal electrodes, and the other is a method of providing a pin diode structure directly under, for example, a feeding pad electrode having a large area other than the modulation region.

CITATION LIST

Patent Literature

PTL 1: Japanese Patent Laid-Open No. 2005-099387

Non Patent Literature

NPL 1: K.-O. Velthaus, et al., "Impedance-Engineered Low Power MZM/Driver Assembly for CFP4-Size Pluggable Long Haul and Metro Transceiver," ECOC2014, Tu.1.1.1

SUMMARY OF INVENTION

Technical Problem

However, the former has a problem that it is difficult to create a larger capacity (e.g., 100 pF or more) than the stray capacity of the modulation region by using an MIM structure. For example, if an insulator is $SiO_2$ of 200 nm (relative permittivity 4.2), a pad electrode should have an area of 0.5 $mm^2$ or more, which becomes a major impediment to downsizing.

In addition, the latter has a problem that the polarity of voltage applied to a pad electrode is limited due to the diode structure and a problem that even by taking a measure to provide, for example, a capacity of an npin structure directly under a pad region, although the maximum voltage value of ESD is reduced depending on the capacity ratio of a modulation section, the failure rate cannot be largely reduced with respect to reverse voltage ESD. That is, a fundamental solution to the improvement of the anti-surge characteristics requires such a structural measure that reverse voltage by ESD is not applied to the modulation region.

The present invention has been accomplished in consideration of the above problems. An object of the present invention is to provide a highly reliable, high speed, and low loss semiconductor optical modulation element that protects a pin junction structure in a modulation region against reverse voltage ESD by configuring an additional capacity having a thyristor structure between a plurality of feeding pad electrodes.

Solution to Problem

In order to solve the above problems, an aspect of the present invention is a semiconductor optical modulation element having an optical waveguide formed in a laminated structure having a pin junction in which at least a first cladding layer that is an n-type or p-type cladding layer, a non-doped core and cladding layer, and a second cladding layer that is a p-type or n-type cladding layer are laminated in this order on a semi-insulating substrate, the semiconductor optical modulation element comprising: a feeding electrode installation section formed on the laminated structure; and at least two feeding electrodes formed on the feeding electrode installation section, wherein the at least two feeding electrodes are connected to a modulation electrode installed on the optical waveguide, in the feeding electrode installation section, the second cladding layer and the non-doped core and cladding layer of the laminated structure are electrically isolated for each of the feeding electrodes so that the feeding electrodes are electrically isolated from each other, and the at least two feeding electrodes are electrically connected to each other via the first cladding layer of the laminated structure, and the optical waveguide and the feeding electrode installation section are electrically isolated in terms of the laminated structure.

Another aspect of the present invention is a semiconductor optical modulation element having an optical waveguide formed in a laminated structure having a pin junction in which at least a first cladding layer that is an n-type or p-type cladding layer, a non-doped core and cladding layer, and a second cladding layer that is a p-type or n-type cladding layer are laminated in this order on a semi-insulating substrate, the semiconductor optical modulation element comprising: a feeding electrode installation section formed on the laminated structure; and at least three feeding electrodes formed on the feeding electrode installation section, wherein at least two of the feeding electrodes are connected to a modulation electrode installed on the optical waveguide and at least one of the feeding electrodes is grounded, in the feeding electrode installation section, the second cladding layer and the non-doped core and cladding layer of the laminated structure are electrically isolated for each of the feeding electrodes so that the feeding electrodes are electrically isolated from one another, and at least the feeding electrodes connected to the modulation electrode and the grounded feeding electrode are electrically connected to each other via the first cladding layer of the laminated structure, and the optical waveguide and the feeding electrode installation section are electrically isolated in terms of the laminated structure.

Another aspect of the present invention is a semiconductor optical modulation element having an optical waveguide formed in a laminated structure having a nipn junction or a pinp junction in which at least a first cladding layer that is an n-type or p-type cladding layer, a non-doped core and cladding layer, a p-type or n-type carrier blocking layer, and a second cladding layer that is an n-type or p-type cladding layer are laminated in this order on a semi-insulating substrate, the semiconductor optical modulation element comprising: a feeding electrode installation section formed on the laminated structure; and at least two feeding electrodes formed on the feeding electrode installation section, wherein the at least two feeding electrodes are connected to a modulation electrode installed on the optical waveguide, in the feeding electrode installation section, the second cladding layer, the p-type or n-type carrier blocking layer, and the non-doped core and cladding layer of the laminated structure are electrically isolated for each of the feeding electrodes so that the feeding electrodes are electrically isolated from each other, and the at least two feeding electrodes are electrically connected to each other via the first cladding layer of the laminated structure, and the optical waveguide and the feeding electrode installation section are electrically isolated in terms of the laminated structure.

Another aspect of the present invention is a semiconductor optical modulation element having an optical waveguide formed in a laminated structure having a nipn junction or a pinp junction in which at least a first cladding layer that is an n-type or p-type cladding layer, a non-doped core and cladding layer, a p-type or n-type carrier blocking layer, and a second cladding layer that is an n-type or p-type cladding layer are laminated in this order on a semi-insulating substrate, the semiconductor optical modulation element comprising: a feeding electrode installation section formed on the laminated structure; and at least three feeding electrodes formed on the feeding electrode installation section, wherein at least two of the feeding electrodes are connected to a modulation electrode installed on the optical waveguide and at least one of the feeding electrodes is grounded, in the feeding electrode installation section, the second cladding layer, the p-type or n-type carrier blocking layer, and the non-doped core and cladding layer of the laminated structure are electrically isolated for each of the feeding electrodes so that the feeding electrodes are electrically isolated from each other, and the feeding electrodes connected to the modulation electrode and the grounded feeding electrode are electrically connected to each other via the second cladding layer of the laminated structure, and the optical waveguide and the feeding electrode installation section are electrically isolated in terms of the laminated structure.

According to another aspect of the present invention, the feeding electrode has a feeding pad formed to contact the semi-insulating substrate.

According to another aspect of the present invention, the feeding electrodes connected to the modulation electrode are electrically connected to the at least one different grounded feeding electrode via the lower cladding layer.

According to another aspect of the present invention, the optical waveguide configures a Mach-Zehnder optical interferometer.

According to another aspect of the present invention, the modulation electrode has a capacity-loaded traveling-wave electrode structure.

Advantageous Effects of Invention

The present invention can protect a pin junction structure in a modulation region against reverse voltage ESD by configuring an additional capacity having a thyristor structure between a plurality of feeding electrodes electrodes in a semiconductor modulator having a pin junction.

DESCRIPTION OF EMBODIMENTS

In the present invention, attention is focused on forward voltage ESD with a low ESD failure rate as a measure against ESD (reverse voltage ESD) in a pn diode structure device. That is, as a measure against ESD, a plurality of diodes are reversely connected in series. Accordingly, even if voltage to be reverse voltage ESD to a modulation region is applied to a device circuit, the voltage becomes forward voltage to any of the diodes in the circuit and a charge is consumed there. This can largely reduce the reverse voltage applied to the other diodes including the modulation region.

An example of a plurality of diodes reversely connected in series as a measure against ESD is a so-called thyristor structure such as an npnp or pnpn junction in which pn junctions are reversely connected in series. The thyristor structure has a mechanism in which forward voltage is definitely applied regardless of the polarity of ESD applied, differently from the case of a pn junction alone. As a result, the thyristor structure has the effect in improving ESD resistance. Therefore, it can be said that addition of an additional circuit having this thyristor structure to a device is effective as a measure against ESD.

In addition, even if voltage of an arbitrary polarity is applied to electrodes at both ends including the thyristor structure, current hardly flows there. Therefore, even if the structure is provided in a feeding pad region, no limitation is imposed on the polarity of the voltage to be applied to the feeding pad.

Further, at least one electrode in a feeding pad electrode group including a plurality of electrodes is connected to a ground at an initial stage of electrical mounting, whereby a thyristor structure can be configured by using the ground electrode even if ESD occurs via any electrode afterwards. As a result, ESD resistance can be improved in the subsequent mounting steps.

Embodiments of the present invention will be described below with reference to the drawings.

First Embodiment

Figure 1:
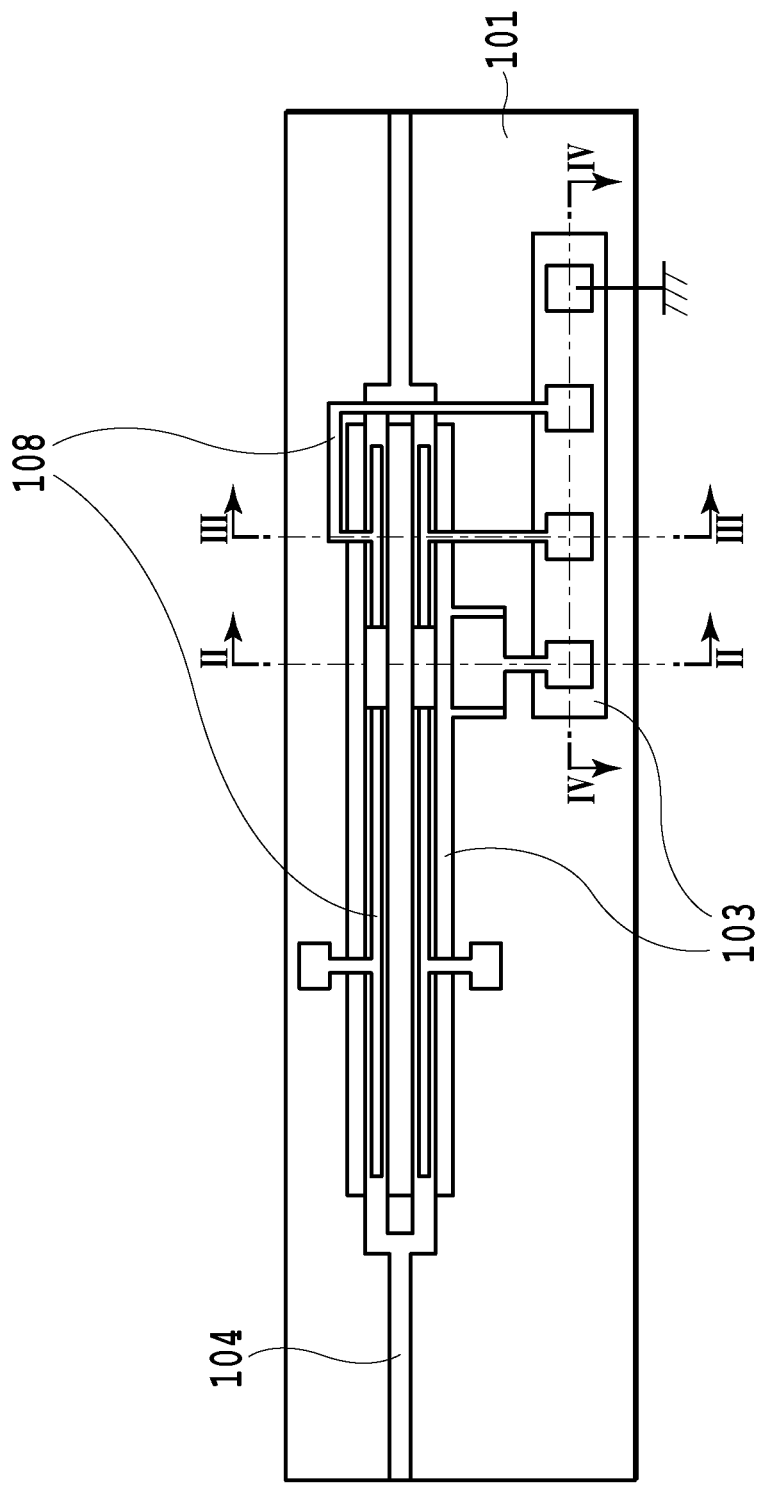
FIG. 1 is a top view of a high-speed modulator with a surge bypass circuit according to a first embodiment of the present invention.
Figure 2:
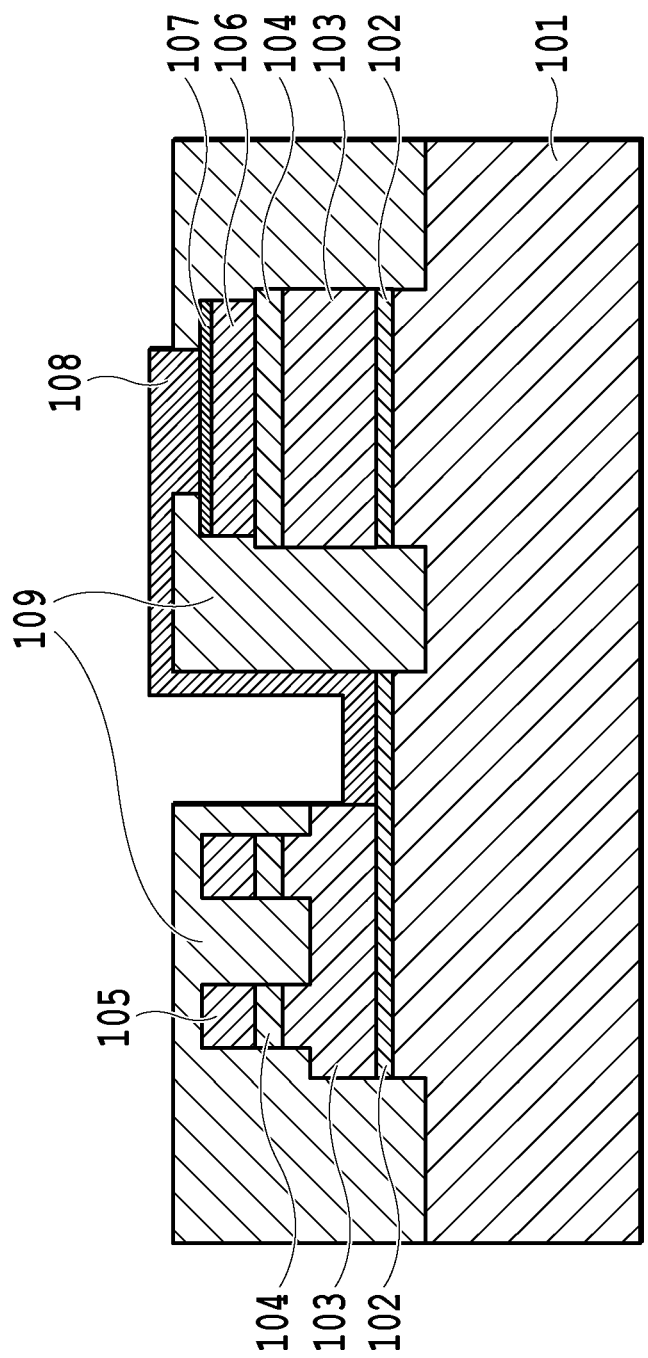
FIG. 2 is a section II-II of FIG. 1.
Figure 3:
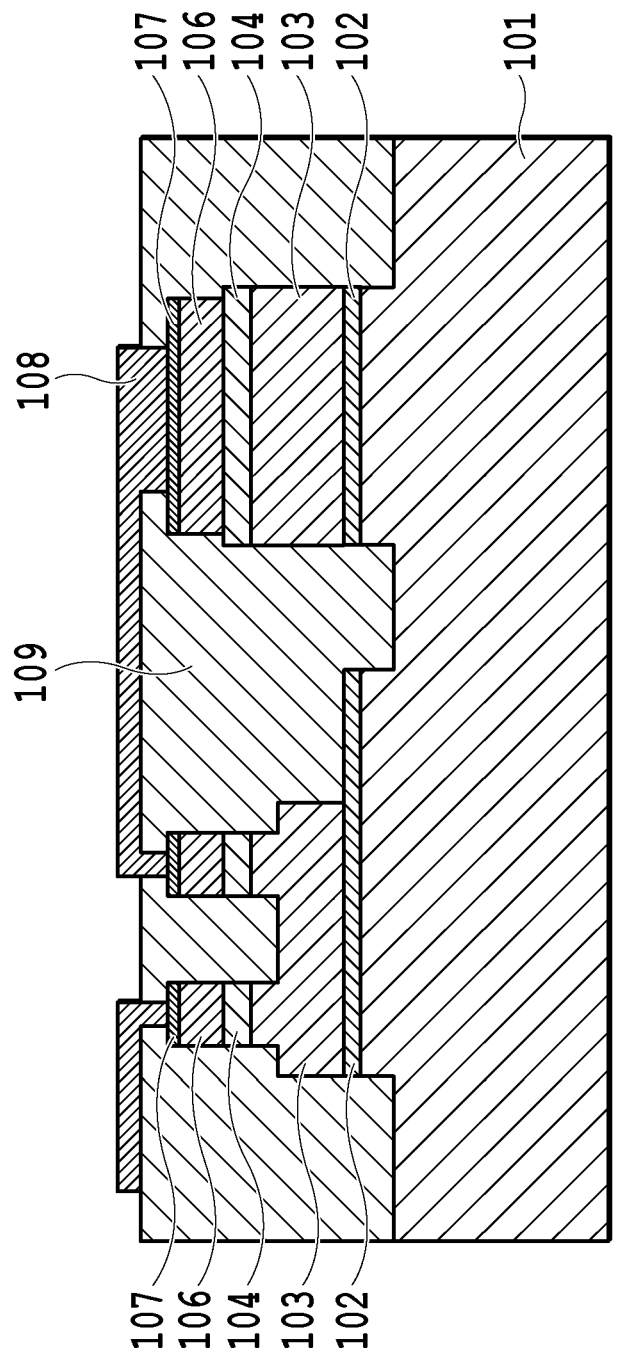
FIG. 3 is a section III-III of FIG. 1.
Figure 4:
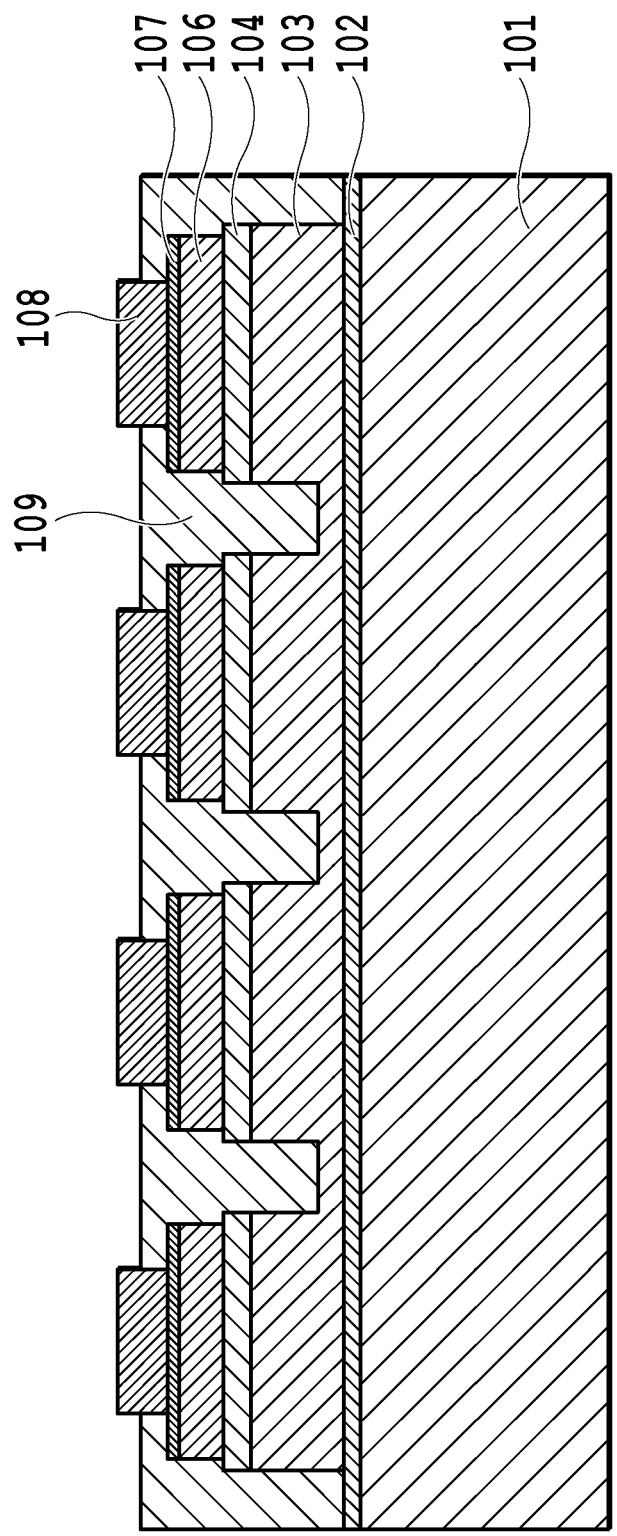
FIG. 4 is a section IV-IV of FIG. 1.

FIG. 1 shows a top view of a high-speed modulator with a surge bypass circuit according to a first embodiment of the present invention. FIG. 2 shows a section II-II of FIG. 1, FIG. 3 shows a section III-III of FIG. 1, and FIG. 4 shows a section IV-IV of FIG. 1.

A substrate 101 uses, for example, an SI-type InP (100) substrate as a sphalerite compound semiconductor crystal. An n-type contact layer 102, an n-type cladding layer 103, a non-doped core/cladding layer 104, a p-type cladding layer 106, and a p-type contact layer 107 are sequentially laminated on the substrate surface by epitaxial growth.

A core layer of the core/cladding layer 104 uses a multiple quantum well structure (PL wavelength: 1.4 μm) including InGaAsP/InGaAsP period for efficient use of a change in refractive index by an electro-optic effect with respect to a wavelength in a 1.5 μm band.

The composition of a cladding layer of the core/cladding layer 104 is, for example, InP having a lower refractive index than that of the core layer. InGaAs, which lattice-matches InP and has a small energy band gap, is used for the n-type contact layer 102 and the p-type contact layer 107.

Since it is only necessary for the composition of each of the core and cladding to have a refractive index contrast, there is clearly no problem even if InGaAlAs having a different composition is used for the core/cladding layer 104, the n-type cladding layer 103, and the p-type cladding layer 106, for example.

Further, the wavelength is not limited to the 1.5 μm band. For example, the present invention does not lose its usefulness even if a 1.3 μm band is used.

For electrical isolation between electrodes, the conductive p-type cladding layer 106 and p-type contact layer 107 other than the modulation region and the feeding pad region are removed by dry etching and chemical etching, and then the non-doped cladding layer 105 (InP in this case) is deposited by crystal regrowth and backfilled with an organic film 109 such as BCB (e.g., FIG. 2). The modulation region is a region in which electrodes 108 of a Mach-Zehnder interferometric waveguide are formed and to which a high-frequency signal of the Mach-Zehnder interferometric waveguide or a direct voltage is applied.

Next, as shown in FIGS. 1 and 4, isolation is provided up to the core/cladding layer 104 by dry etching using an SiO$_2$ mask, thereby forming a Mach-Zehnder interferometric waveguide and a plurality of feeding pad installation sections. After that, as shown in FIGS. 2 and 3, the n-type contact layer 102 and the n-type cladding layer 103 are removed by an etching process except for the modulation region of the Mach-Zehnder interferometric waveguide and the feeding region in which the feeding pad installation sections are formed so that the modulation region and the semiconductor of the lower part of the feeding region are electrically isolated.

After the upper surface is planarized by the BCB 109, the BCB 109 forming the electrodes 108 is partially removed so as to expose the n-type contact layer 102 and the p-type contact layer 107. The electrodes 108 are formed from Au/Ti by, for example, vapor deposition and plating so that the electrodes 108 are electrically connected to the n-type contact layer 102 and the p-type contact layer 107. A plurality of feeding pads are formed on the common n-type contact layer 102 and n-type cladding layer 103 and a pinip junction is formed between the feeding pads.

Figure 5:
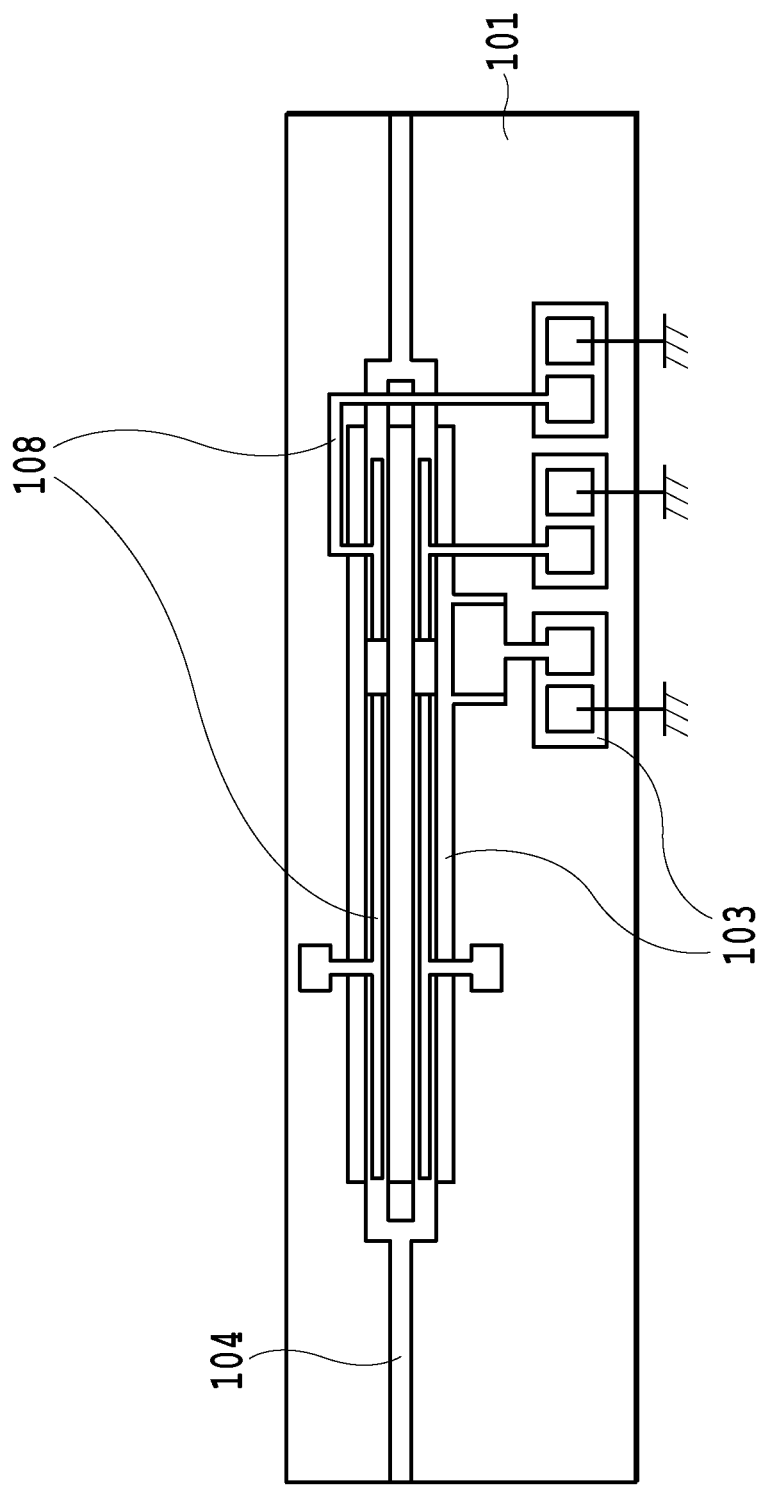
FIG. 5 is a top view of another high-speed modulator with a surge bypass circuit according to a first embodiment of the present invention.

Next, in the case of performing, for example, Au wire bonding for the feeding pads of the electrodes 108, it is preferable that at least one of the feeding pads be initially connected to a ground as shown in FIG. 1. This enables connection including a pinip junction between the grounded pads even if ESD is applied to any feeding pad. Even in the absence of a feeding pad for ground connection, specifying the order of connecting Au wires (for example, a feeding pad for lower n-type cladding is finally connected to a wire) can prevent the present invention from losing its usefulness. Instead of the feeding pad electrode pattern shown in FIG. 1, feeding pad electrodes may be electrically isolated from one another and at least one grounded feeding pad may be formed separately for each feeding pad, for example, as shown in FIG. 5.

When driving the element as a modulator, the use of capacity-loaded traveling-wave electrodes enables higher speed modulation operation. However, it is clear that the present invention does not lose its usefulness even in the case of a distributed constant line or a lumped constant line without the addition of a capacity.

Further, in the present embodiment, layers are laminated in the order of n-i-p from the substrate surface. However, it is clear that the present invention does not lose its usefulness even if layers are laminated, for example, in the order of p-i-n from the substrate surface.

Further, in the present embodiment, the electrodes 108 are formed on two arm waveguides, respectively, in the modulation region of the Mach-Zehnder interferometric waveguide and three feeding pads are provided so as to be connected to an electrode for modulation. However, an electrode may be formed on only at least one of p-type contact layers 107 of arm waveguides and two feeding pads may be connected to an electrode for modulation.

Second Embodiment

Figure 6:
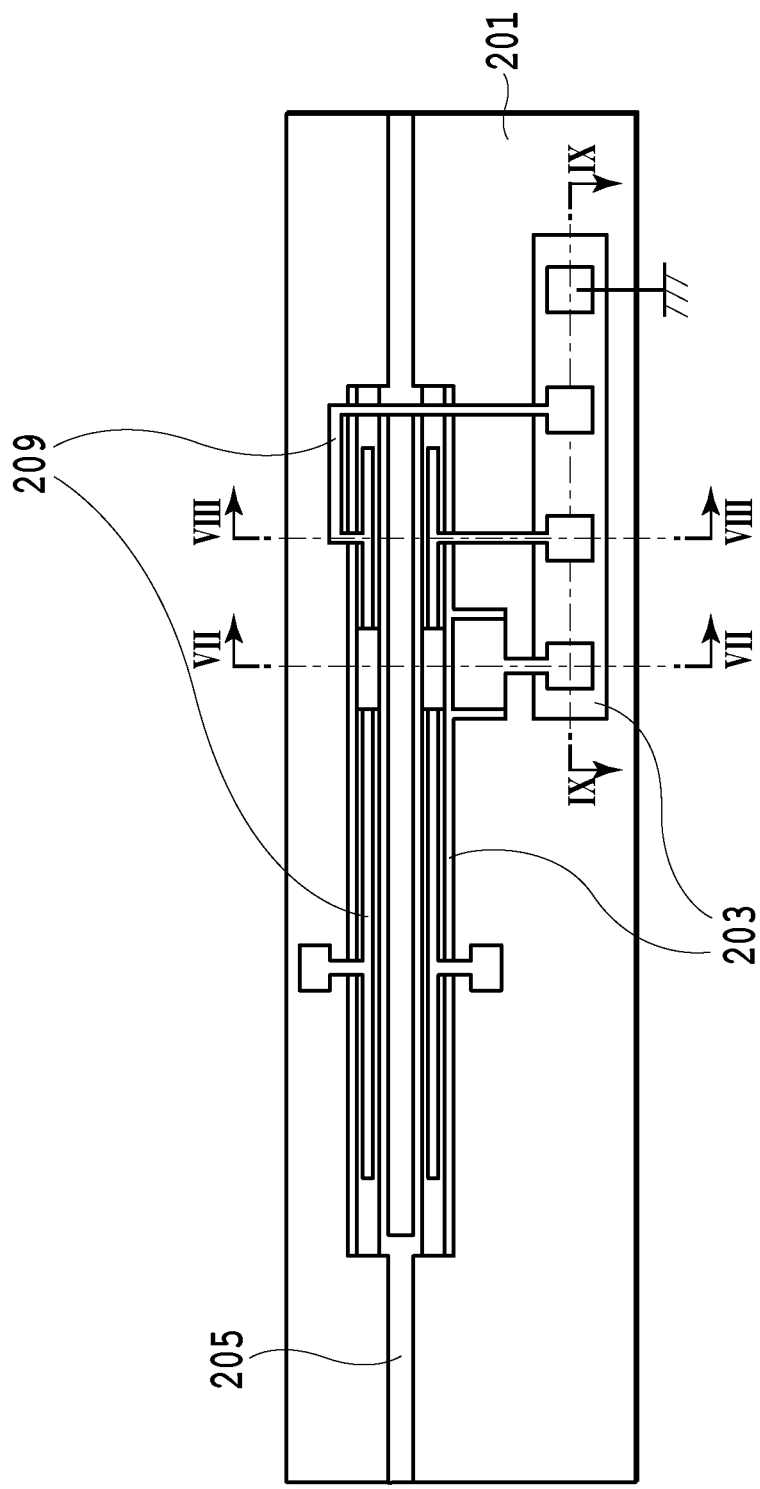
FIG. 6 is a top view of a high-speed modulator with a surge bypass circuit according to a second embodiment of the present invention.
Figure 7:
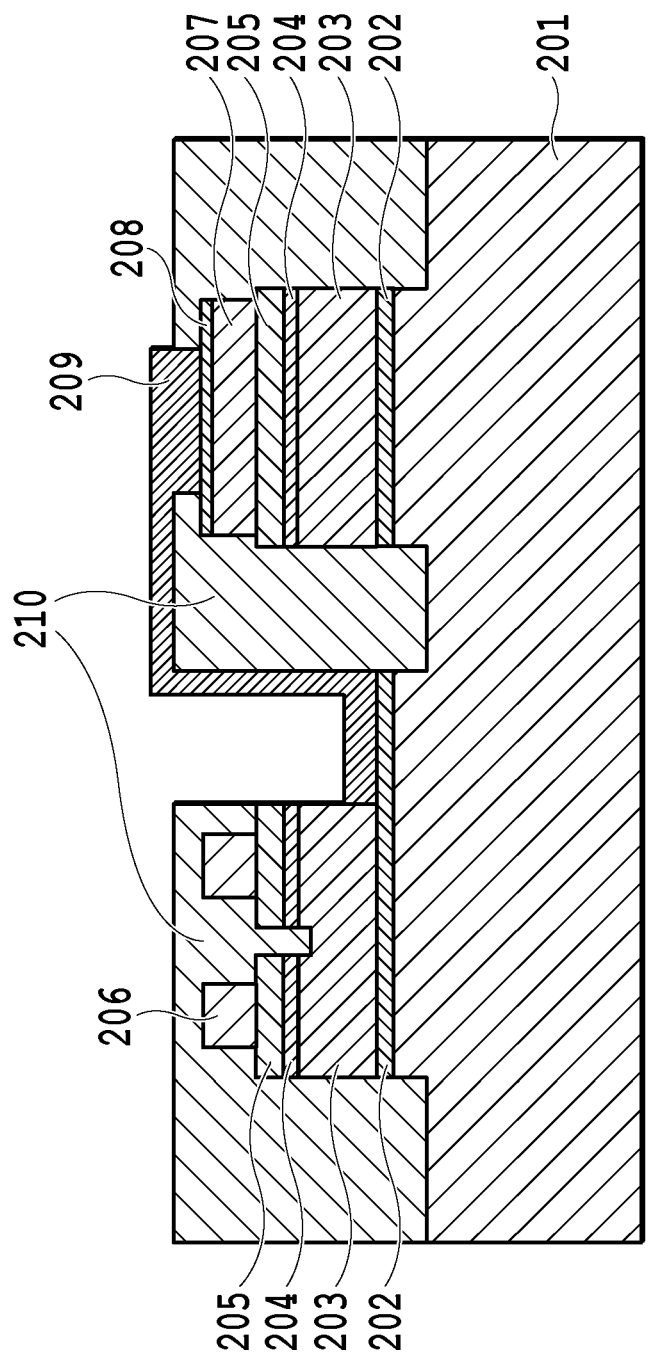
FIG. 7 is a section VII-VII of FIG. 6.
Figure 8:
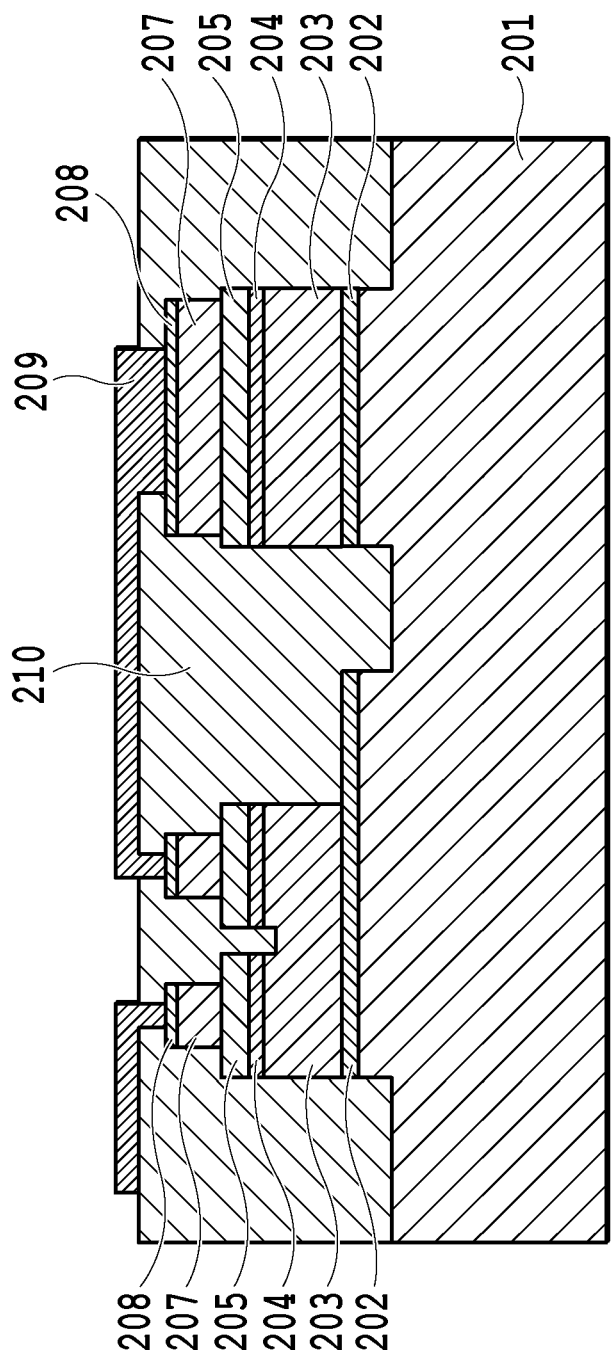
FIG. 8 is a section VIII-VIII of FIG. 6.
Figure 9:
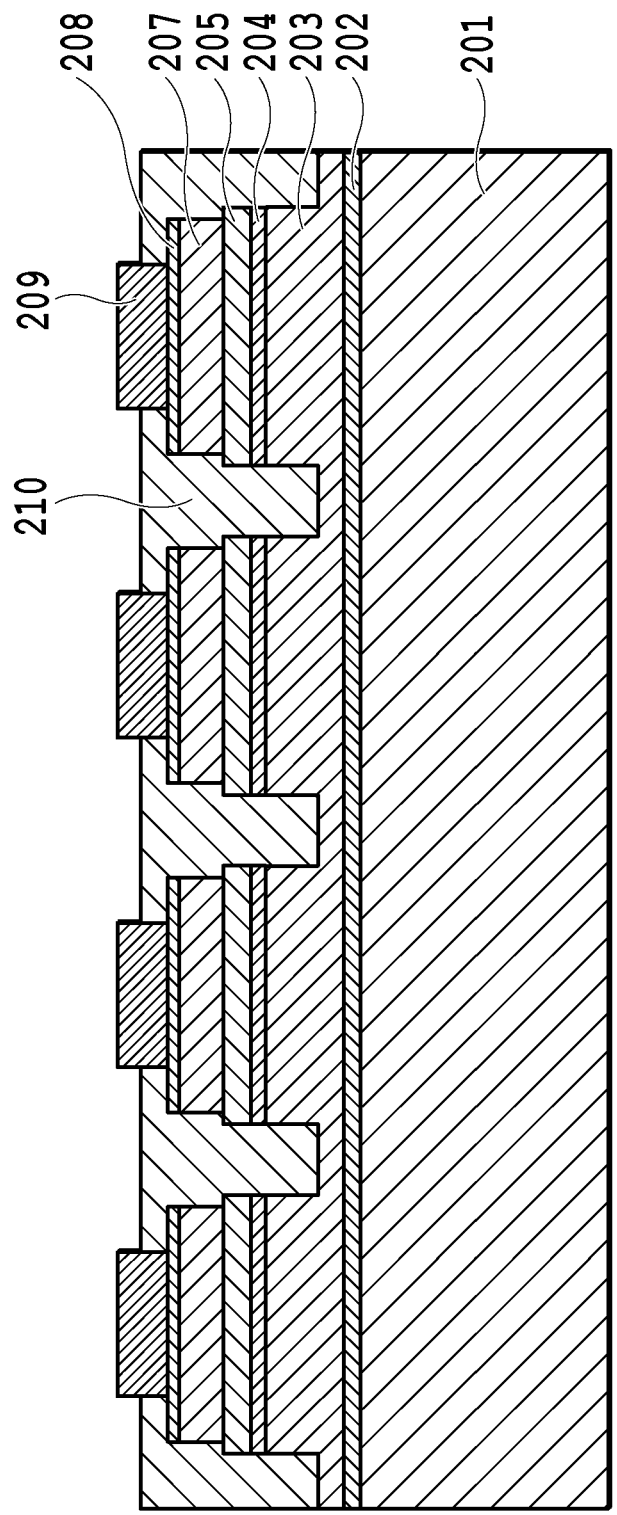
FIG. 9 is a section IX-IX of FIG. 6.

FIG. 6 shows a top view of a high-speed modulator with a surge bypass circuit according to a second embodiment of the present invention. FIG. 7 shows a section VII-VII of FIG. 6, FIG. 8 shows a section VIII-VIII of FIG. 6, and FIG. 9 shows a section IX-IX of FIG. 6. The second embodiment is different from the first embodiment in that a nipn structure capable of configuring a higher speed and lower loss optical modulator is adopted as a semiconductor layer structure instead of a general pin structure. As described above, even in the case of this structure having a problem in ESD resistance as compared with the pin structure, the ESD resistance can be improved by using the thyristor structure as an additional circuit.

A substrate 201 uses, for example, an SI-type InP (100) substrate as a sphalerite compound semiconductor crystal. An n-type contact layer 202, an n-type cladding layer 203, a p-type carrier blocking layer 204, a non-doped core/cladding layer 205, an n-type cladding layer 207, and an n-type contact layer 208 are sequentially laminated on the substrate surface by epitaxial growth.

A core layer of the core/cladding layer 205 uses a multiple quantum well structure (PL wavelength: 1.4 μm) including InGaAsP/InGaAsP period for efficient use of a change in refractive index by an electro-optic effect with respect to a wavelength in a 1.5 μm band.

The composition of a cladding layer of the core/cladding layer 205 is, for example, InP having a lower refractive index than that of the core layer. InGaAs, which lattice-matches InP and has a small energy band gap, is used for the n-type contact layers 202 and 208.

Since it is only necessary for the composition of each of the core and cladding to have a refractive index contrast, there is clearly no problem even if InGaAlAs having a different composition is used for the core/cladding layer 205 and the n-type cladding layers 203 and 207, for example.

Further, the wavelength is not limited to the 1.5 μm band. For example, the present invention does not lose its usefulness even if a 1.3 μm band is used.

For electrical isolation between electrodes, the conductive n-type cladding layer 207 and n-type contact layer 208 other than the modulation region and the feeding pad region are removed by dry etching and chemical etching, and then the semi-insulating (SI) cladding layer 206 (InP in this case) is deposited by crystal regrowth and backfilled (e.g., FIG. 7).

Next, as shown in FIGS. 6 and 9, isolation is provided up to the p-type carrier blocking layer 203 by dry etching using an SiO$_2$ mask, thereby forming a Mach-Zehnder interferometric waveguide and a plurality of feeding pad installation sections. After that, as shown in FIGS. 7 and 8, the n-type contact layer 202 and the n-type cladding layer 203 are removed by an etching process except for the modulation region of the Mach-Zehnder interferometric waveguide and the feeding region in which the feeding pad installation sections are formed so that the modulation region and the semiconductor of the lower part of the feeding region are electrically isolated.

After the upper surface is planarized by an organic film such as BCB, the BCB 210 forming the electrodes 209 is partially removed so as to expose the n-type contact layer 202 and the n-type contact layer 208. The electrodes 209 are formed from Au/Ti by, for example, vapor deposition and plating so that the electrodes 209 are electrically connected to the n-type contact layer 202 and the n-type contact layer 208. Since a plurality of feeding pads are formed on the common n-type contact layer 202 and n-type cladding layer 203 and a npinipn junction including a thyristor structure is formed between the feeding pads, ESD externally applied to the feeding pads forms a junction.

Figure 10:
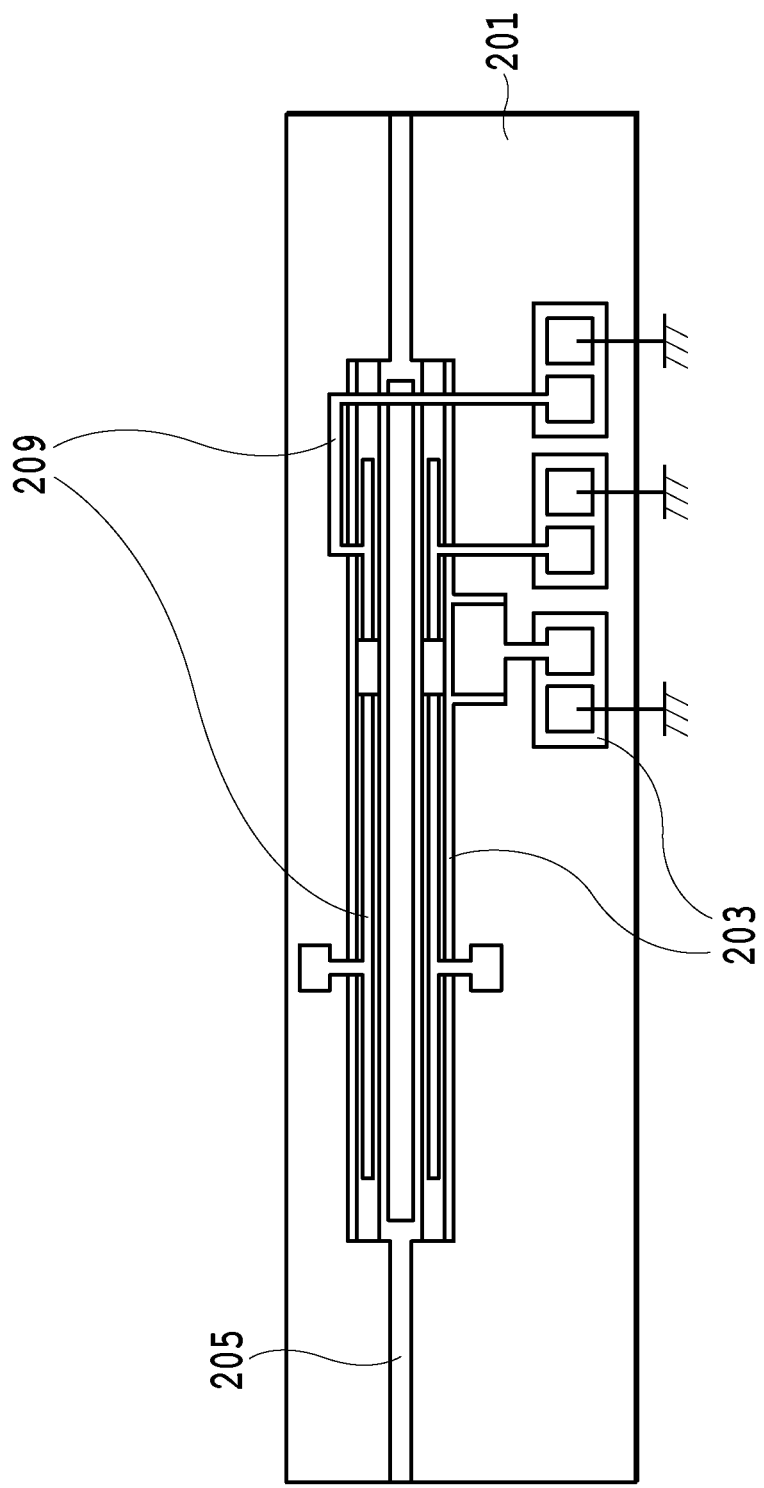
FIG. 10 is a top view of another high-speed modulator with a surge bypass circuit according to the second embodiment of the present invention.

Next, in the case of performing, for example, Au wire bonding for the feeding pads of the electrodes 209, it is preferable that at least one of the feeding pads be initially connected to a ground as shown in FIG. 6, whereby connection including a thyristor structure can be made between the grounded pads even if ESD is applied to any feeding pad. Even in the absence of a pad connected to a ground, specifying the order of connecting Au wires (for example, a feeding pad for lower n-type cladding is finally connected to a wire) can prevent the present invention from losing its usefulness. Instead of the feeding pad electrode pattern shown in FIG. 6, feeding pad electrodes may be electrically isolated from each other and at least one grounded electrode pad may be formed separately for each feeding pad, for example, as shown in FIG. 10.

When driving the element as a modulator, the use of capacity-loaded traveling-wave electrodes enables higher speed modulation operation. However, it is clear that the present invention does not lose its usefulness even in the case of a distributed constant line or a lumped constant line without the addition of a capacity.

Further, in the present embodiment, layers are laminated in the order of n-p-i-n from the substrate surface. However, it is clear that the present invention does not lose its usefulness even in the case of laminating layers in the order of n-i-p-n from the substrate surface, for example.

Further, in the present embodiment, the waveguide structure of the modulation region is a waveguide in the form of a ridge. However, it is clear that the present invention does not lose its usefulness even in the case of a waveguide having a high-mesa structure like the first embodiment, for example.

Further, in the present embodiment, the electrodes 209 are formed on two arm waveguides, respectively, in the modulation region of the Mach-Zehnder interferometric waveguide and three feeding pads are provided so as to be connected to an electrode for modulation. However, an electrode may be formed on only at least one of n-type contact layers 208 of arm waveguides and two feeding pads may be connected to an electrode for modulation.

Figure 11:
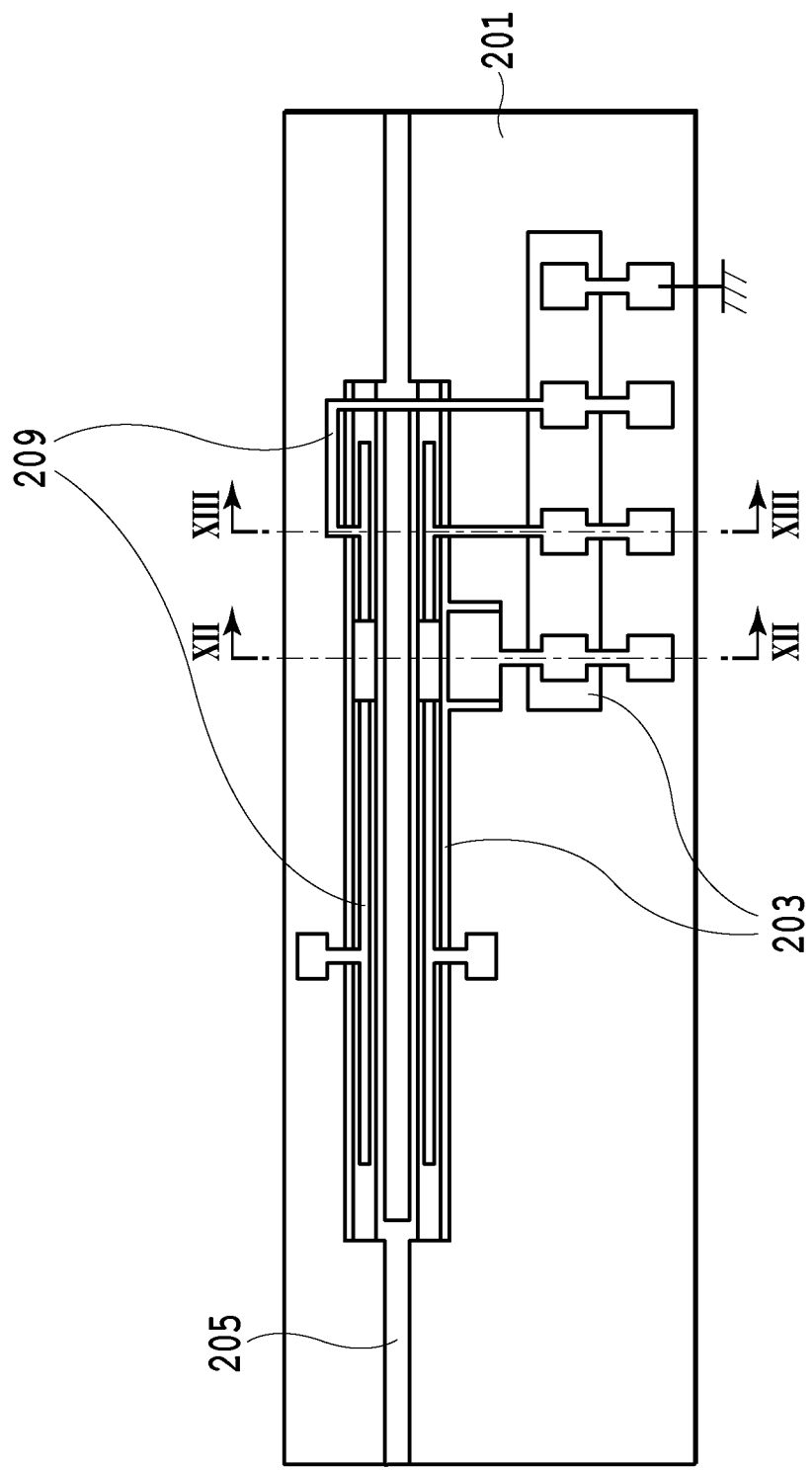
FIG. 11 is a top view of yet another high-speed modulator with a surge bypass circuit according to the second embodiment of the present invention.
Figure 12:
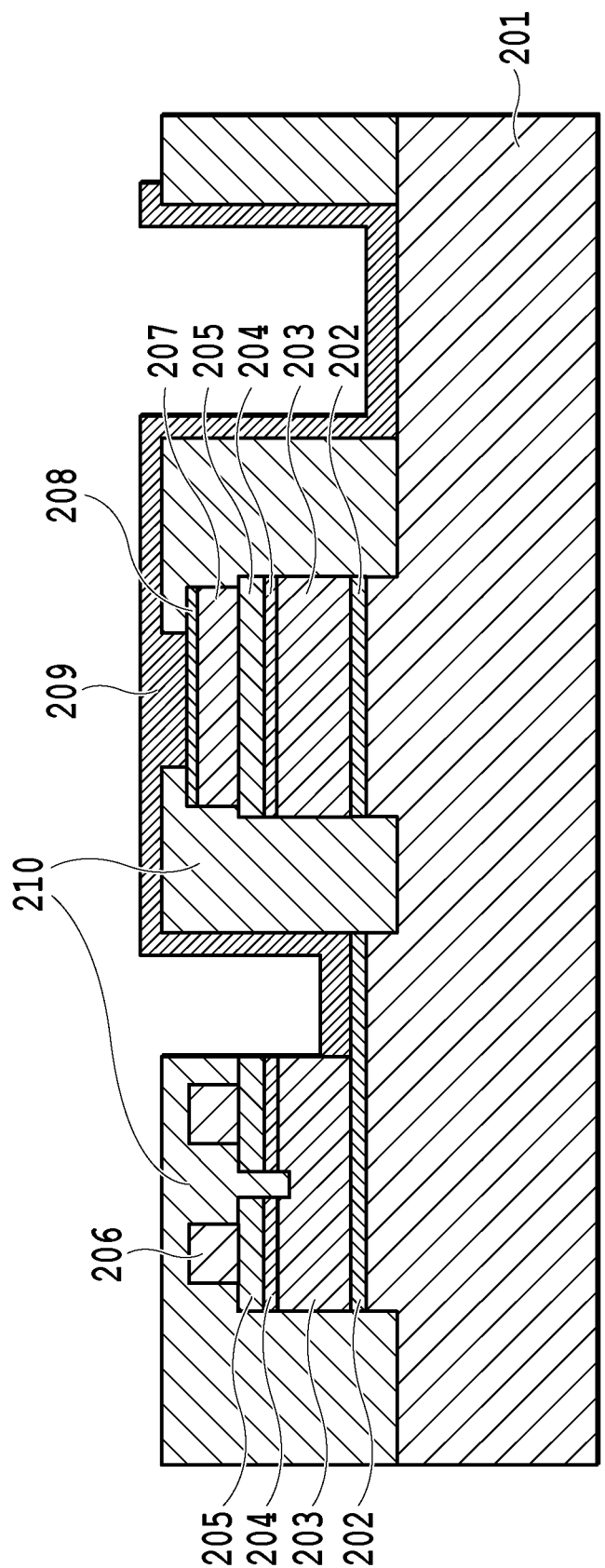
FIG. 12 is a section XII-XII of FIG. 11.
Figure 13:
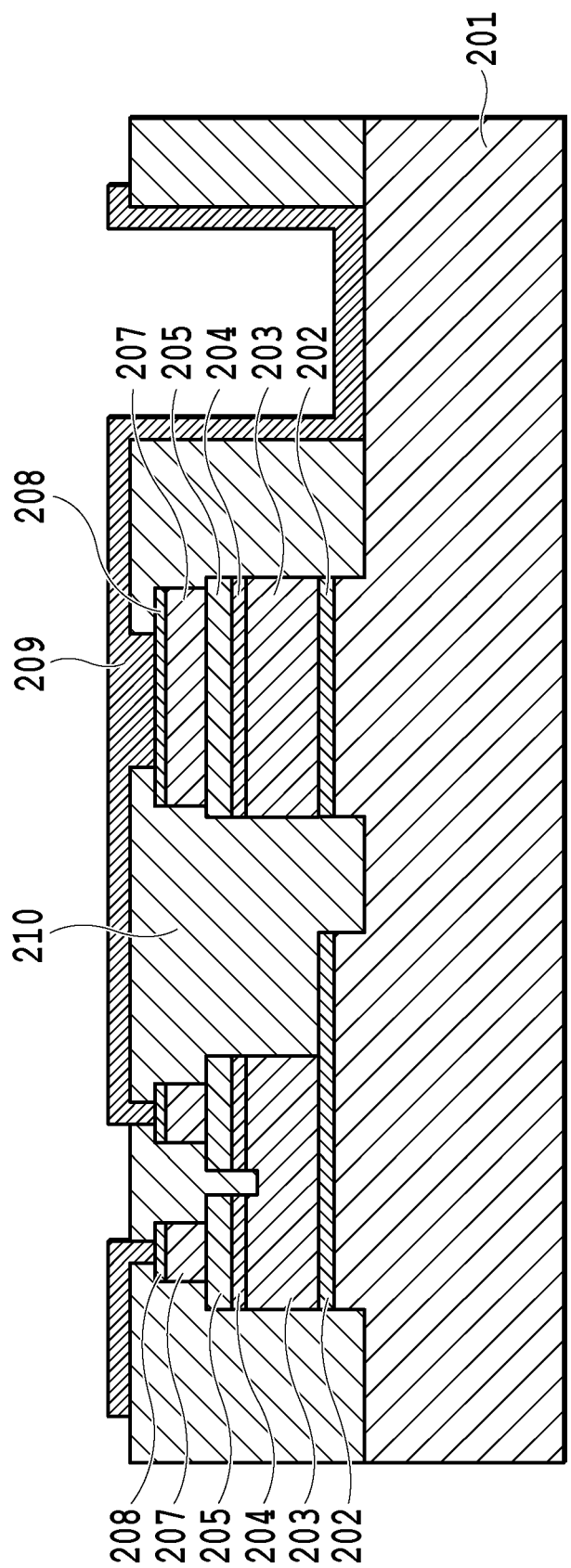
FIG. 13 is a section XIII-XIII of FIG. 11.
Figure 14:
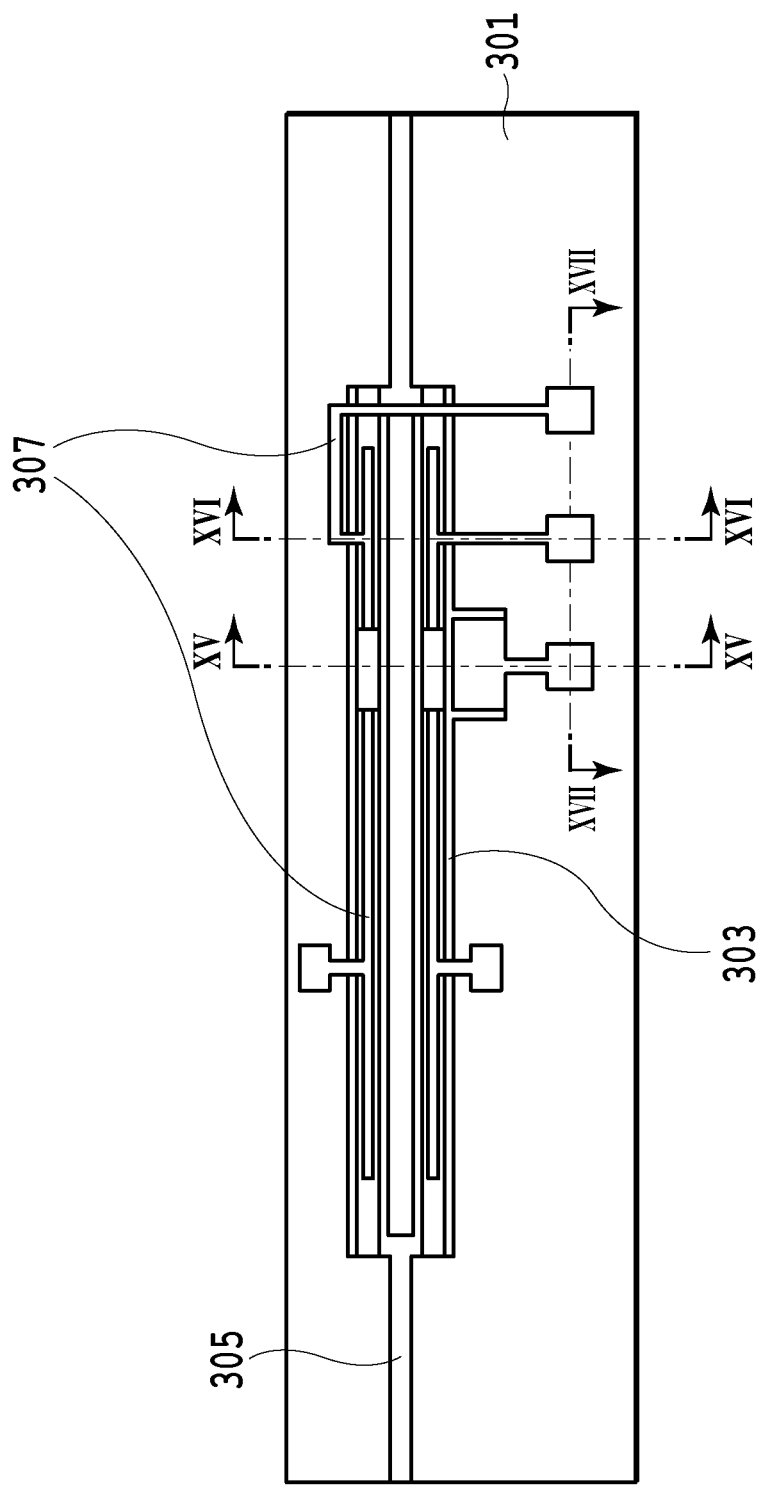
FIG. 14 is a top view of a conventional semiconductor optical modulator having an npin structure.
Figure 15:
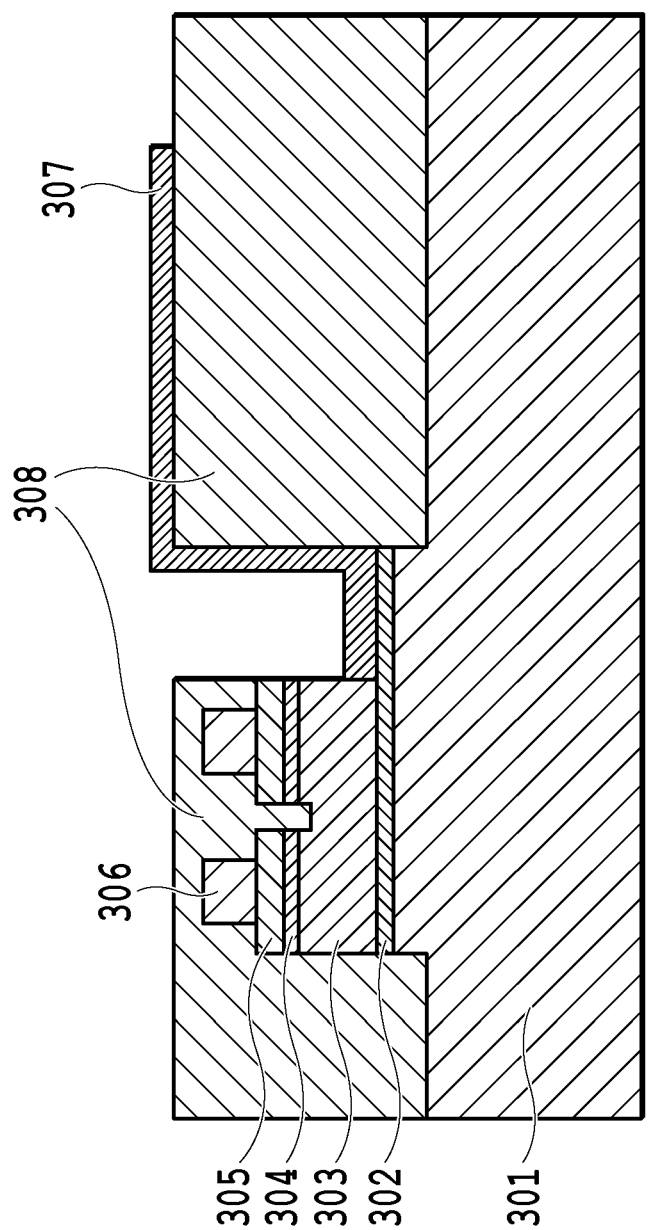
FIG. 15 is a section XV-XV of FIG. 14.
Figure 16:
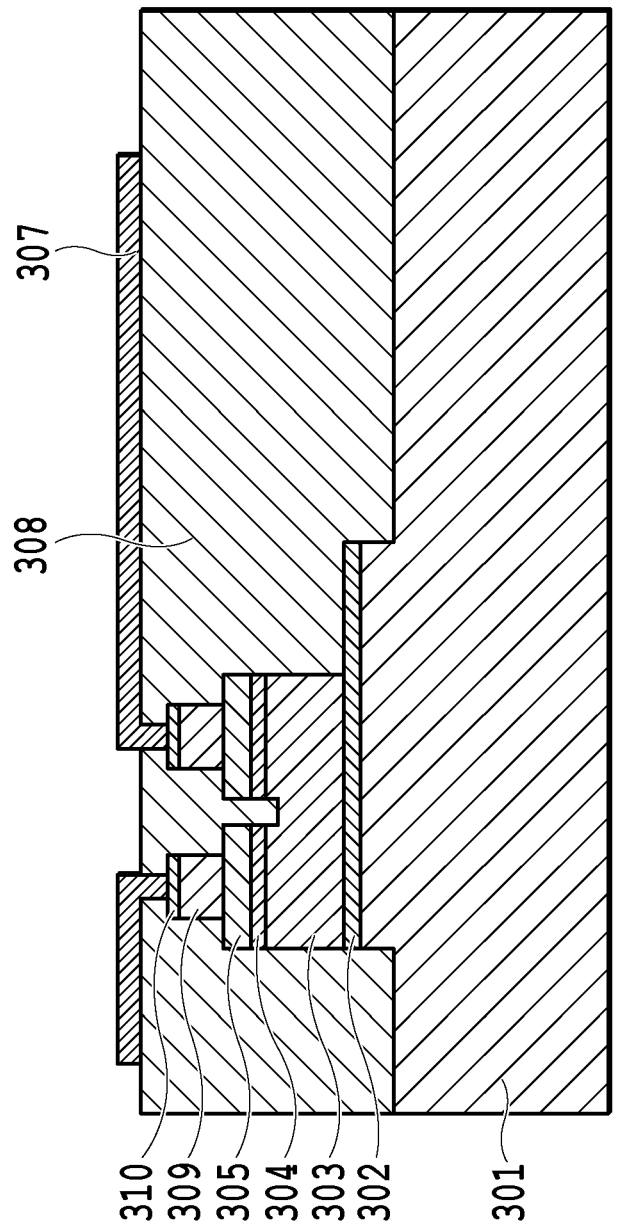
FIG. 16 is a section XVI-XVI of FIG. 14.
Figure 17:
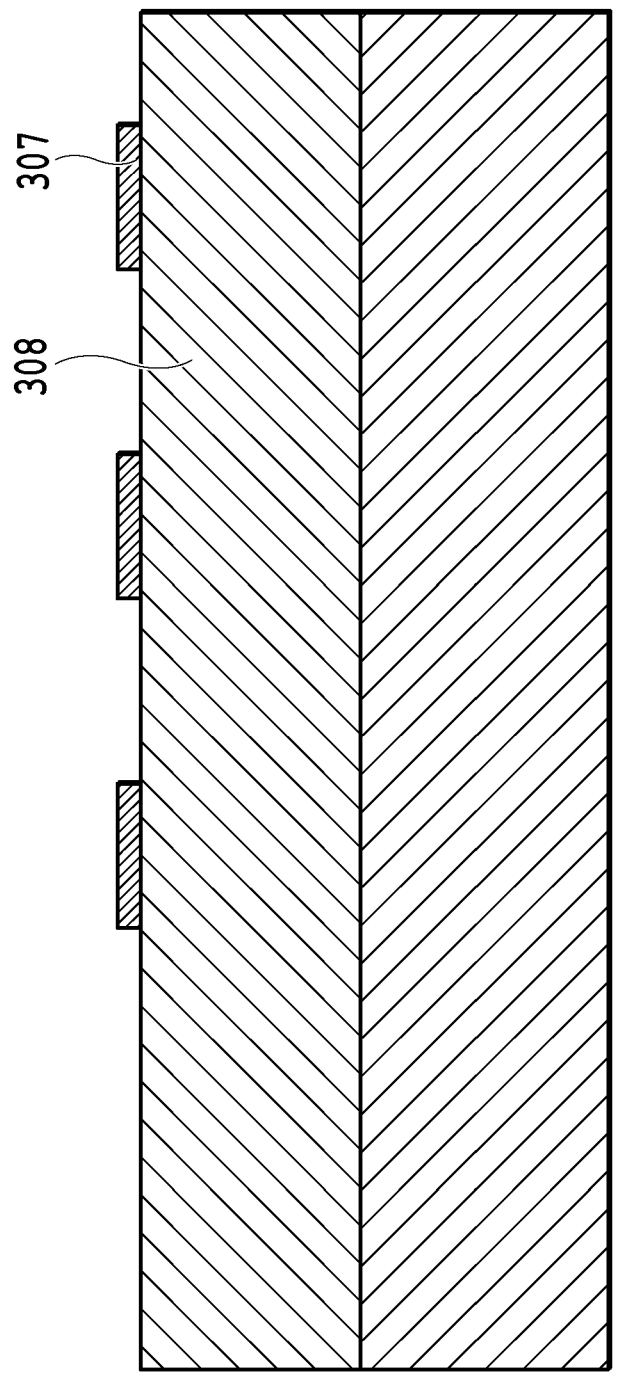
FIG. 17 is a section XVII-XVII of FIG. 14.

Further, FIG. 11 shows a top view of another high-speed modulator with a surge bypass circuit according to the second embodiment of the present invention. FIG. 12 shows a section XII-XII of FIG. 11 and FIG. 13 shows a section XIII-XIII of FIG. 11. In the structure shown in FIGS. 11 to 13, feeding pads may be formed so as to contact the substrate 201 exposed by removing the BCB 210, instead of providing feeding pads on a semiconductor layer structure. This can prevent the pn junction of the semiconductor layer structure from being broken by pressurization at the time of wire bonding. Although feeding pads are formed across the semiconductor layer structure on the feeding side from the Mach-Zehnder interferometric waveguide in FIGS. 11 to 13, the feeding pads may be formed between the Mach-Zehnder interferometric waveguide and the semiconductor layer structure on the feeding side.

The configuration in which the feeding pads are formed not on the semiconductor layer structure but directly on the substrate 201 has been described by using the second embodiment as an example, but it is needless to say that the same advantageous result can be achieved by forming the feeding pads directly on the substrate 101 also in the first embodiment.

REFERENCE SIGNS LIST

101, 201 substrate
102, 202, 208 n-type contact layer
103, 203, 207 n-type cladding layer
104, 205 non-doped core/cladding layer
105 non-doped cladding layer
106 p-type cladding layer
107 p-type contact layer
108, 209 electrode
109, 210 BCB
204 p-type carrier blocking layer
206 SI cladding layer
301 substrate
302 n-type contact layer
303 n-type cladding layer
304 p-type carrier blocking layer
305 non-doped core/cladding layer
306 SI cladding layer
307 electrode
308 BCB

The invention claimed is:

1. A semiconductor optical modulation element having an optical waveguide formed in a laminated structure having a pin junction in which at least a first cladding layer that is an n-type or p-type cladding layer, a non-doped core and cladding layer, and a second cladding layer that is a p-type or n-type cladding layer are laminated in this order on a semi-insulating substrate, the semiconductor optical modulation element comprising:
a feeding electrode installation section formed on the laminated structure; and
at least two feeding electrodes formed on the feeding electrode installation section,
wherein the at least two feeding electrodes are connected to a modulation electrode installed on the optical waveguide,
in the feeding electrode installation section, the second cladding layer and the non-doped core and cladding layer of the laminated structure are electrically isolated for each of the feeding electrodes so that the feeding electrodes are electrically isolated from each other, and the at least two feeding electrodes are electrically connected to each other via the first cladding layer of the laminated structure, and
the optical waveguide and the feeding electrode installation section are electrically isolated in terms of the laminated structure.

2. The semiconductor optical modulation element according to claim 1, wherein the feeding electrode has a feeding pad formed to contact the semi-insulating substrate.

3. The semiconductor optical modulation element according to claim 1, wherein the optical waveguide configures a Mach-Zehnder optical interferometer.

4. The semiconductor optical modulation element according to claim 1, wherein the modulation electrode has a capacity-loaded traveling-wave electrode structure.

5. A semiconductor optical modulation element having an optical waveguide formed in a laminated structure having a pin junction in which at least a first cladding layer that is an n-type or p-type cladding layer, a non-doped core and cladding layer, and a second cladding layer that is a p-type or n-type cladding layer are laminated in this order on a semi-insulating substrate, the semiconductor optical modulation element comprising:
a feeding electrode installation section formed on the laminated structure; and
at least three feeding electrodes formed on the feeding electrode installation section,
wherein at least two of the feeding electrodes are connected to a modulation electrode installed on the optical waveguide and at least one of the feeding electrodes is grounded,
in the feeding electrode installation section, the second cladding layer and the non-doped core and cladding layer of the laminated structure are electrically isolated for each of the feeding electrodes so that the feeding electrodes are electrically isolated from one another, and at least the feeding electrodes connected to the modulation electrode and the grounded feeding electrode are electrically connected to each other via the first cladding layer of the laminated structure, and
the optical waveguide and the feeding electrode installation section are electrically isolated in terms of the laminated structure.

6. The semiconductor optical modulation element according claim 5, wherein the feeding electrode has a feeding pad formed to contact the semi-insulating substrate.

7. The semiconductor optical modulation element according to claim 5, wherein each of the feeding electrodes connected to the modulation electrode is electrically connected to the at least one different grounded feeding electrode via the first cladding layer.

8. The semiconductor optical modulation element according to claim 5, wherein the optical waveguide configures a Mach-Zehnder optical interferometer.

9. The semiconductor optical modulation element according to claim 5, wherein the modulation electrode has a capacity-loaded traveling-wave electrode structure.

10. A semiconductor optical modulation element having an optical waveguide formed in a laminated structure having a nipn junction or a pinp junction in which at least a first cladding layer that is an n-type or p-type cladding layer, a non-doped core and cladding layer, a p-type or n-type carrier blocking layer, and a second cladding layer that is an n-type or p-type cladding layer are laminated in this order on a semi-insulating substrate, the semiconductor optical modulation element comprising:
 a feeding electrode installation section formed on the laminated structure; and
 at least two feeding electrodes formed on the feeding electrode installation section,
 wherein the at least two feeding electrodes are connected to a modulation electrode installed on the optical waveguide,
 in the feeding electrode installation section, the second cladding layer, the p-type or n-type carrier blocking layer, and the non-doped core and cladding layer of the laminated structure are electrically isolated for each of the feeding electrodes so that the feeding electrodes are electrically isolated from each other, and the at least two feeding electrodes are electrically connected to each other via the first cladding layer of the laminated structure, and
 the optical waveguide and the feeding electrode installation section are electrically isolated in terms of the laminated structure.

11. The semiconductor optical modulation element according to claim 10, wherein the feeding electrode has a feeding pad formed to contact the semi-insulating substrate.

12. The semiconductor optical modulation element according to claim 10, wherein the optical waveguide configures a Mach-Zehnder optical interferometer.

13. The semiconductor optical modulation element according to claim 10, wherein the modulation electrode has a capacity-loaded traveling-wave electrode structure.

14. A semiconductor optical modulation element having an optical waveguide formed in a laminated structure having a nipn junction or a pinp junction in which at least a first cladding layer that is an n-type or p-type cladding layer, a non-doped core and cladding layer, a p-type or n-type carrier blocking layer, and a second cladding layer that is an n-type or p-type cladding layer are laminated in this order on a semi-insulating substrate, the semiconductor optical modulation element comprising:
 a feeding electrode installation section formed on the laminated structure; and
 at least three feeding electrodes formed on the feeding electrode installation section,
 wherein at least two of the feeding electrodes are connected to a modulation electrode installed on the optical waveguide and at least one of the feeding electrodes is grounded,
 in the feeding electrode installation section, the second cladding layer, the p-type or n-type carrier blocking layer, and the non-doped core and cladding layer of the laminated structure are electrically isolated for each of the feeding electrodes so that the feeding electrodes are electrically isolated from each other, and the feeding electrodes connected to the modulation electrode and the grounded feeding electrode are electrically connected to each other via the second cladding layer of the laminated structure, and
 the optical waveguide and the feeding electrode installation section are electrically isolated in terms of the laminated structure.

15. The semiconductor optical modulation element according to claim 14, wherein the feeding electrode has a feeding pad formed to contact the semi-insulating substrate.

16. The semiconductor optical modulation element according to claim 14, wherein each of the feeding electrodes connected to the modulation electrode is electrically connected to the at least one different grounded feeding electrode via the first cladding layer.

17. The semiconductor optical modulation element according to claim 14, wherein the optical waveguide configures a Mach-Zehnder optical interferometer.

18. The semiconductor optical modulation element according to claim 14, wherein the modulation electrode has a capacity-loaded traveling-wave electrode structure.

* * * * *